United States Patent [19]
Marisco, Jr. et al.

[11] 3,912,767
[45] Oct. 14, 1975

[54] NOVEL SULFONATE ESTERS OF 2-HYDROXY-3-(METHYLTHIO)-1,4-NAPHTHOQUINONE

[75] Inventors: Joseph William Marisco, Jr., Pearl River; Leon Goldman, Nanuet, both of N.Y.

[73] Assignee: American Cyanamid Company, Stamford, Conn.

[22] Filed: Oct. 21, 1974

[21] Appl. No.: 516,561

[52] U.S. Cl............................ 260/396 R; 424/303
[51] Int. Cl.²...............C07C 143/02; C07C 143/26; C07C 143/28
[58] Field of Search ................................ 260/396 R

[56] References Cited
OTHER PUBLICATIONS

Chem. Abstracts 51:5311a.
Chem. Abstracts 52:1125c.
Chem. Abstracts 74:112244s.
Wagner. Zook, Synthetic Org. Chem., p. 823 (1953).

*Primary Examiner*—Vivian Garner
*Attorney, Agent, or Firm*—Edward A. Conroy, Jr.

[57] ABSTRACT

This disclosure describes novel sulfonate esters of 2-hydroxy-3-(methylthio)-1,4-naphthoquinone having antibacterial and antifungal activity.

10 Claims, No Drawings

NOVEL SULFONATE ESTERS OF 2-HYDROXY-3-(METHYLTHIO)-1,4-NAPHTHOQUINONE

BRIEF SUMMARY OF THE INVENTION

This invention relates to sulfonate esters of 2-hydroxy-3-(methylthio)-1,4-naphthoquinone and, more particularly, is concerned with compounds of the following general fomula:

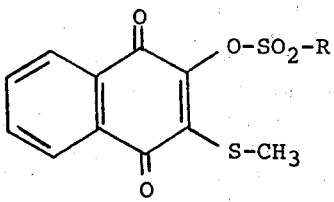

wherein R is lower alkyl, phenyl, or monosubstituted phenyl of the formula:

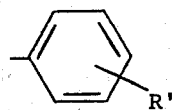

wherein R' is halogen or lower alkyl. Suitable lower alkyl groups contemplated by the present invention are those having up to four carbon atoms such as, for example, methyl, ethyl, isopropyl, sec-butyl, etc. Halogen is exemplified by chloro, bromo, and iodo.

DETAILED DESCRIPTION OF THE INVENTION

The novel compounds of the present invention are yellow or orange crystalline solids having characteristic melting points and infrared absorption spectra. These sulfonate esters are insoluble in water and hexane, sparingly soluble in lower alkanols, and soluble in chloroform, dichloromethane, ethyl acetate, acetone, and N,N-dimethylformamide.

The novel sulfonate esters of this invention may be readily prepared according to the following reaction scheme:

In accordance with the above reaction scheme, 2-hydroxy-3-(methylthio)-1,4-naphthoquinone (I) is reacted with a sulfonyl chloride (II) wherein R is as hereinabove defined in the presence of a hindered tertiary base such as diisopropylethylamine (III) in a suitable solvent such as acetone at 0°C. to 50°C. for 1.5 hours to several days (preferably 1 day) to produce the desired sulfonate ester (V). When acetone is used as the solvent, the by-product diisopropylethylamine hydrochloride (IV) remains in solution while the sulfonate ester (V) may crystallize. Other suitable solvents include pyridine and non-hydroxylic solvents such as chloroform, dichloromethane, carbon tetrachloride, and N,N-dimethylformamide. Other suitable hindered tertiary base acid acceptors to bind the hydrogen chloride formed during the reaction include trimethylamine, triethylamine, tripropylamine, pyridine and substituted pyridines such as collidine or lutidine.

Suitable sulfonyl chlorides (II) which may be employed in the above synthesis include 1-propanesulfonyl chloride, 1-butanesulfonyl chloride and 2-butanesulfonyl chloride, m-chlorobenzenesulfonyl chloride, o-bromobenzenesulfonyl chloride, m-iodobenzenesulfonyl chloride, o-iodobenzenesulfonyl chloride, p-(sec-butyl)benzenesulfonyl chloride, and p-(isopropyl)benzenesulfonyl chloride.

The 2-hydroxy-3-(methylthio)-1,4-naphthoquinone (I) is a blood red crystalline solid prepared by demethylation of (1,4-dihydro-3-hydroxy-1,4-dioxo-2-naphthyl)dimethylsulfonium hydroxide inner salt in pyridine containing perchloric acid. This inner salt (also named the 3-dimethylsulfonium ylide of 2-hydroxy-1,4-naphthoquinone) is prepared by the method of R. Gompper and H. Euchner, Ber. 99, 527 (1966).

The novel compounds of the present invention are useful as antimicrobial agents since they possess activity in vitro against Gram-negative and Gram-positive bacteria. This activity against a variety of standard lab-

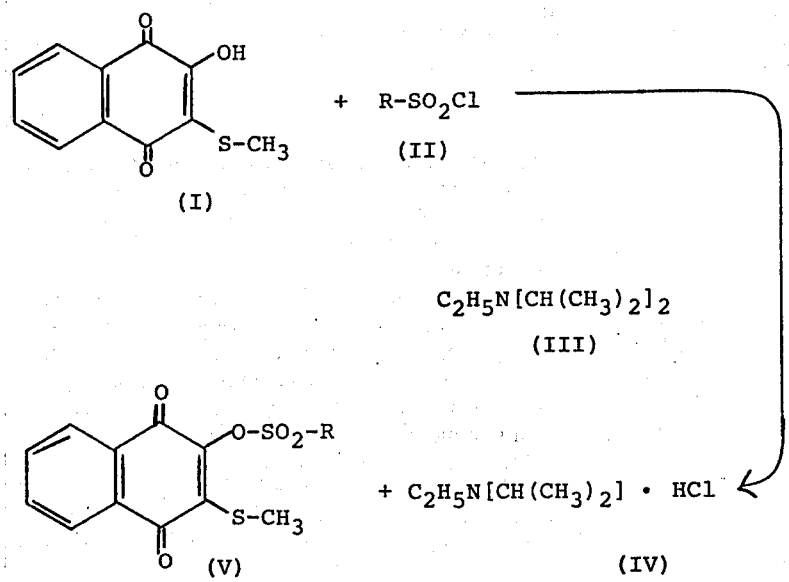

oratory microorganisms is determined by the agar-dilution technique. In this assay, the compound to be tested is dissolved in dimethyl sulfoxide so that 10.0 mg. of test compound is contained per milliliter of solution. Observing sterile techniques, 10-fold serial dilutions of the test solution are made. A 0.2 ml., a 0.1 ml. and a 0.05 ml. portion of the original solution and of each of the decimal dilutions are then added to and mixed with 20 ml. of warm, sterile trypticase-soy agar capable of supporting growth of the test cultures. The sterile nutrient agar solutions containing the different dilutions of the test compound along with suitable and comparable control dilutions containing no test compound, are then allowed to cool in Petri dishes, thereby forming solid agar plates.

The test organisms are prepared for use by growing in trypticase soy broth overnight. Each broth culture is diluted 10-fold with physiological saline solution. Using a Steers Replicator, a standard amount of the resulting live suspensions is then, still employing sterile techniques, imprinted upon the surfaces of each of the agar plates and the resulting inoculated plates are then incubated. After an appropriate period of time, each of the inoculated areas on each of the plates is inspected visually and the extent, if any, of growth is noted. The minimal inhibitory concentration (mcg./ml.) is defined as the concentration of test compound causing essentially complete inhibition of any particular organism.

In a representative operation, the minimal inhibitory concentration of typical compounds of this invention against standard laboratory microorganisms, as determined in the above-described assay, are set forth in Table I below wherein Compound I is 1,4-dihydro-3-(methylthio)-1,4-dioxo-2-naphthyl p-toluenesulfonate Compound II is 1,4-dihydro-3-(methylthio)-1,4-dioxo-2-naphthyl methanesulfonate Compound III is 1,4-dihydro-3-(methylthio)-1,4-dioxo-2-naphthyl benzenesulfonate Compound IV is 1,4-dihydro-3-(methylthio)-1,4-dioxo-2-naphthyl p-bromobenzenesulfonate

TABLE I

| Organism | Minimal Inhibitory Concentration mcg./ml. Compound | | | |
|---|---|---|---|---|
|  | I | II | III | IV |
| Mycobacterium smegmatis ATCC 606 | 10 | 10 | 25 | 10 |
| Staphylococcus aureus Rose ATCC 14154 | 50 | 25 | 50 | 50 |
| Streptococcus pyogenes C 203 | 25 | 10 | 25 | 25 |
| Proteus vulgaris ATCC 9484 |  | 250 |  |  |
| Salmonella typhosa ATCC 6539 |  | 250 |  |  |

The novel compounds of the present invention are useful antifungal agents since they possess activity in vitro against fungal cultures capable of causing disease in man or animals. The activity against a variety of standard laboratory microorganisms is determined by the agar-dilution technique. In this assay the compound to be tested is dissolved in dimethyl sulfoxide so that 10.0 mg. of test compound is contained per milliliter of solution. Observing sterile techniques, 10-fold serial dilutions of the test solution are made. A 0.2 ml., 0.1 ml., and 0.05 ml. portion of the original solution and each of the decimal dilutions are then added to and mixed with 20 ml. of warm, sterile asparagine-meat extract agar capable of supporting growth of the test culture. The standard sterile nutrient agar solutions, containing the different dilutions of the test compound, along with suitable and comparable control dilutions containing no test compound, are then allowed to cool in Petri dishes, thereby forming solid agar plates. The yeast-like test fungi are prepared for use by growing in trypticase soy broth overnight. These broth cultures are diluted 10-fold in physiological saline at the time of use. The filamentous fungi are grown to maturity on slants of potato-dextrose agar. Spores and mycelia are harvested by washing the growth from the slants with sterile physiological saline solution.

Using a Steers Replicator, a standardized amount of each of the resulting live suspensions is then, still employing sterile techniques, imprinted upon the surfaces of each of the agar plates and the resulting inoculated plates are then incubated. After an appropriate period of time, each of the inoculated areas on each of the plates is inspected visually and the extent, if any, of growth is noted. The minimal inhibitory concentration (mcg./ml.) is defined as the concentration of test compound causing essentially complete inhibition of any particular organism.

In a representative operation, the minimal inhibitory concentration of typical compounds of this invention against standard laboratory microorganisms, as determined in the above-described assay, are recorded in Table II below wherein compounds I, II, III and IV are as hereinbefore described.

TABLE II

| Organism | Minimal Inhibitory Concentration (mcg./ml.) Compound | | | |
|---|---|---|---|---|
|  | I | II | III | IV |
| Candida albicans E 83 |  | 5 | 5 | 10 |
| Cryptococcus neoformans E 183 | 5 | 10 | 10 | 10 |
| Microsporum canis ATCC 10214 | 1 | 1 | 2.5 | 2.5 |
| Microsporum gypseum ATCC 14683 | 2.5 | 2.5 | 2.5 | 2.5 |
| Phialophthora jeanselmei E 16 |  | 250 | 100 |  |
| Trichophyton tonsurans NIH 662 | 1 | 1 | 2.5 | 2.5 |
| Trichophyton mentagrophytes E 11 | 1 | 1 | 2.5 | 2.5 |
| Trichophyton rubrum E 97 | 2.5 | 2.5 | 2.5 | 5 |

In addition to their antibacterial and antifungal properties, one of these sulfonate esters, 1,4-dihydro-3-(methylthio)-1,4-dioxo-2-naphthyl methanesulfonate exhibits anti-inflammatory activity. In determining the acute anti-inflammatory activity of this compound, Royal Hart, Wistar strain, rats ranging in weight from 80 to 90 g. were used. The rats were fasted overnight prior to dosing but had free access to water. The drugs in aqueous suspension were administered, by gavage, in a volume of 1.7 ml. per 50 g. of rat [corresponds to hydration volume used by Winter, et al., Proc. Soc. Exp. Biol. Med., III, 544–547 (1962)].

The phlogistic agent used was carrageenin prepared as a sterile 1% suspension in 0.9% sodium chloride for routine testing. A volume of 0.05 ml. was injected through a 26 gauge needle into the plantar tissue of the right hind paw. Measurements were made 5 hours after drug administration (four hours after carrageenin challenge). Volumes of both the normal and carrageenin inflamed feet were determined. The differences between the two measurements was considered to be the increased edema due to the carrageenin administration. Results were expressed as a C/T efficacy ratio (edema of control animals/edema of treated animals). Table III summarizes the results of the effect of anti-inflammatory agents on carrageenin induced edema of the rat paw.

TABLE III

| Treatment | Oral Dose mg./kg. | No. of Rats | Ratio Control/-Treated Edema |
|---|---|---|---|
| 1,4-Dihydro-3- | 250 | 2 | 2.1 |
| (methylthio)-1,4- | 250 | 2 | 1.0 |
| dioxo-2-naphthyl | 250 | 2 | 4.1 |
| methanesulfonate | 250 | 2 | 1.6 |
| Aspirin | 250 | 32 | 2.8 |
|  | 83 | 32 | 1.4 |
|  | 27 | 32 | 1.2 |
|  | 9 | 32 | 0.9 |
|  | 3 | 32 | 1.0 |
| Phenylbutazone | 250 | 32 | 2.3 |
|  | 83 | 32 | 2.4 |
|  | 27 | 32 | 1.7 |
|  | 9 | 32 | 1.3 |
|  | 3 | 32 | 1.3 |
| Indomethacin | 250 | 32 | 2.9 |
|  | 83 | 32 | 2.3 |
|  | 27 | 32 | 2.2 |
|  | 9 | 32 | 2.0 |
|  | 3 | 32 | 1.5 |
| Controls | — | 64 | — |

This invention will be described in greater detail in conjunction with the following specific examples.

EXAMPLE 1

Preparation of
2-hydroxy-3-(methylthio)-1,4-naphthoquinone

A mixture of 2.34 g. of the 3-dimethylsulfonium ylide of 2-hydroxy-1,4-naphthoquinone, 1.43 ml. of 70–72% perchloric acid and 25 ml. of pyridine is heated under reflux for 2 hours and allowed to stand at room temperature overnight. The dark reddish-black solution is evaporated under reduced pressure to a reddish-black crystalline residue. This residue is extracted with four 35-ml. portions of boiling ether and the combined ether extracts are evaporated under reduced pressure to give 1.80 g. of red crystals. Recrystallization from ethyl acetate-petroleum ether (20°–60°C.) gives 1.46 g. of 2-hydroxy-3-(methylthio)-1,4-naphthoquinone as blood-red needles, m.p. 127°–129°C.

EXAMPLE 2

Preparation of
1,4-dihydro-3-(methylthio)-1,4-dioxo-2-naphthyl methanesulfonate

A mixture of 10.0 g. of 2-hydroxy-3-(methylthio)-1,4-naphthoquinone, 5.87 g. of diisopropylethylamine, 6.61 g. of methanesulfonyl chloride and 200 ml. of acetone is stirred at room temperature, with moisture excluded, for 1.5 hours and then chilled for 3 days. The resulting light orange crystals are removed by filtration, washed with acetone-hexane and air-dried to give 8.10 g. Recrystallization from dichloromethane-hexane gives 7.35 g. of 1,4-dihydro-3-(methylthio)-1,4-dioxo-2-naphthyl methanesulfonate as yellow crystals, m.p. 191°–193°C.

By replacing the methanesulfonyl chloride in the above procedure with an equimolar amount of ethanesulfonyl chloride, 2-propanesulfonyl chloride, 2-methylpropane-1-sulfonyl chloride, 1-butanesulfonyl chloride or 2-butanesulfonyl chloride there are obtained the corresponding 1,4-dihydro-3-(methylthio)-1,4-dioxo-2-naphthyl ethanesulfonate, 1,4-dihydro-3-(methylthio)-1,4-dioxo-2-naphthyl 2-propanesulfonate, 1,4-dihydro-3-(methylthio)-1,4-dioxo-2-naphthyl 2-methylpropane-1-sulfonate, 1,4-dihydro-3-(methylthio)-1,4-dioxo-2-naphthyl 1-butanesulfonate, and 1,4-dihydro-3-(methylthio)-1,4-dioxo-2-naphthyl 2-butanesulfonate, respectively.

EXAMPLE 3

Preparation of
1,4-dihydro-3-(methylthio)-1,4-dioxo-2-naphthyl benzenesulfonate

A mixture of 10.0 g. of 2-hydroxy-3-(methylthio)-1,4-naphthoquinone, 5.87 g. of diisopropylethylamine, 8.00 g. of benzenesulfonyl chloride and 200 ml. of acetone is stirred at room temperature, with moisture excluded, for 22.5 hours and then evaporated under reduced pressure to a gum which crystallizes. Water is added and the resulting brownish-yellow crystals are removed by filtration, washed with water and air dried to yield 17.7 g. Recrystallization from dichloromethane-hexane using activated charcoal and then from acetone gives 9.38 g. of 1,4-dihydro-3-(methylthio)-1,4-dioxo-2-naphthyl benzenesulfonate as orange crystals, m.p. 132°–134°C.

EXAMPLE 4

Preparation of
1,4-dihydro-3-(methylthio)-1,4-dioxo-2-naphthyl p-bromobenzenesulfonate A mixture of 10.0 g. of 2-hydroxy-3-(methylthio)-1,4-naphthoquinone, 5.87 g. of diisopropylethylamine, 11.6 g. of p-bromobenzenesulfonyl chloride and 200 ml. of acetone is stirred at room temperature, with moisture excluded, for 22.5 hours and then evaporated under reduced pressure to a reddish-brown gum which crystallizes. Water is added and the resulting yellow crystals are removed by filtration, washed with water and air-dried to give 20.8 g. Two recrystallizations from acetone yield 8.25 g. of 1,4-dihydro-3-(methylthio)-1,4-dioxo-2-naphthyl p-bromobenzenesulfonate as yellow crystals, m.p. 125.5°–127.5°C.

By replacing the p-bromobenzenesulfonyl chloride in the above procedure with an equimolar amount of o-chlorobenzenesulfonyl chloride, p-chlorobenzenesulfonyl chloride, m-bromobenzenesulfonyl chloride, or o-iodobenzenesulfonyl chloride there are obtained the corresponding 1,4-dihydro-3-(methylthio)-1,4-dioxo-2-naphthyl o-chlorobenzenesulfonate, 1,4-dihydro-3-(methylthio)-1,4-dioxo-2-naphthyl p-chlorobenzenesulfonate, 1,4-dihydro-3-(methylthio)-1,4-dioxo-2-naphthyl m-bromobenzenesulfonate and 1,4-dihydro-3-(methylthio)-1,4-dioxo-2-naphthyl o-iodobenzenesulfonate, respectively.

EXAMPLE 5
Preparation of 1,4-dihydro-3-(methylthio)-1,4-dioxo-2-naphthyl p-toluenesulfonate A mixture of 10.0 g. of 2-hydroxy-3-(methylthio)-1,4-naphthoquinone, 5.87 g. of diisopropylethylamine, 8.63 g. of p-toluenesulfonyl chloride and 200 ml. of acetone is stirred at room temperature, with moisture excluded, for 24 hours. The resulting mixture is evaporated under reduced pressure to a reddish-orange crystalline residue. A 150-ml. portion of water is added to the residue and after 1 hour the orange crystals are removed by filtration, washed with water and air-dried to yield 16.2 g. Recrystallization from ethyl acetate-hexane gives 12.9 g. of 1,4-dihydro-3-(methylthio)-1,4-dioxo-2-naphthyl p-toluenesulfonate as golden-yellow crystals, m.p. 148.5°–151°C.

By replacing the p-toluenesulfonyl chloride in the above procedure with an equimolar amount of m-toluenesulfonyl chloride, o-toluenesulfonyl chloride, o-ethylbenzenesulfonyl chloride, p-(isopropyl)benzenesulfonyl chloride, or p-(sec-butyl)benzenesulfonyl chloride there are obtained the corresponding 1,4-dihydro-3-(methylthio)-1,4-dioxo-2-naphthyl m-toluenesulfonate, 1,4-dihydro-3-(methylthio)-1,4-dioxo-2-naphthyl o-toluenesulfonate, 1,4-dihydro-3-(methylthio)-1,4-dioxo-2-naphthyl o-ethylbenzenesulfonate, 1,4-dihydro-3-(methylthio)-1,4-dioxo-2-naphthyl p-(isopropyl)benzenesulfonate, and 1,4-dihydro-3-methylthio)-1,4-dioxo-2-naphthyl p-(sec-butyl)-benzenesulfonate, respectively.

We claim:
1. Compounds of the formula:

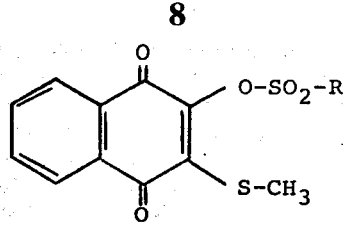

wherein R is selected from the group consisting of lower alkyl, phenyl, and a moiety of the formula:

wherein R' is lower alkyl or halogen.

2. The compound in accordance with claim 1 wherein R is methyl.
3. The compound in accordance with claim 1 wherein R is ethyl.
4. The compound in accordance with claim 1 wherein R is isopropyl.
5. The compound in accordance with claim 1 wherein R is phenyl.
6. The compound in accordance with claim 1 wherein R is p-chlorophenyl.
7. The compound in accordance with claim 1 wherein R is p-bromophenyl.
8. The compound in accordance with claim 1 wherein R is p-tolyl.
9. The compound in accordance with claim 1 wherein R is o-tolyl.
10. The compound in accordance with claim 1 wherein R is o-ethylphenyl.

* * * * *